United States Patent
Kim et al.

(10) Patent No.: US 11,549,876 B2
(45) Date of Patent: Jan. 10, 2023

(54) APPARATUS AND METHOD FOR DETERMINING CHEMICAL INPUT

(71) Applicant: DOOSAN ENERBILITY CO., LTD., Gyeongsangnam-do (KR)

(72) Inventors: Seongjoon Kim, Seoul (KR); Jungwon Park, Seoul (KR); Youngkyu Lee, Bucheon-si (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 652 days.

(21) Appl. No.: 15/700,988

(22) Filed: Sep. 11, 2017

(65) Prior Publication Data

US 2018/0073969 A1 Mar. 15, 2018

(30) Foreign Application Priority Data

Sep. 12, 2016 (KR) .................. 10-2016-0117375

(51) Int. Cl.
| | |
|---|---|
| *G01N 15/06* | (2006.01) |
| *C02F 1/00* | (2006.01) |
| *G01N 25/00* | (2006.01) |
| *C02F 1/52* | (2006.01) |
| *C02F 1/24* | (2006.01) |
| *C02F 1/66* | (2006.01) |
| *C02F 103/08* | (2006.01) |

(52) U.S. Cl.
CPC .............. *G01N 15/06* (2013.01); *C02F 1/008* (2013.01); *G01N 25/00* (2013.01); *C02F 1/24* (2013.01); *C02F 1/5209* (2013.01); *C02F 1/5245* (2013.01); *C02F 1/66* (2013.01); *C02F 2103/08* (2013.01); *C02F 2209/001* (2013.01); *C02F 2209/006* (2013.01); *C02F 2209/02* (2013.01); *C02F 2209/11* (2013.01)

(58) Field of Classification Search
None
See application file for complete search history.

(56) References Cited

U.S. PATENT DOCUMENTS

2011/0036775 A1* 2/2011 Tarquin ................ B01D 61/022
210/654

FOREIGN PATENT DOCUMENTS

| EP | 2772467 A1 | 9/2014 |
|---|---|---|
| JP | 2002-126721 A | 5/2002 |
| JP | 2005-329359 A | 12/2005 |
| KR | 1020040079648 B1 | 9/2004 |
| KR | 1020120110997 B1 | 10/2012 |
| KR | 1020130022132 B1 | 3/2013 |
| KR | 1020130049666 B1 | 5/2013 |

OTHER PUBLICATIONS

An extended European search report issued by the European Patent Office dated Nov. 13, 2017 in connection with European patent application No. 17190331.3.
Mohd Nordin Adlan et al., "Optimization of coagulation and dissolved air flotation (DAF) treatment of semi-aerobic landfill leachate using response surface methodology (RSM)," Deslination, Aug. 15, 2011, pp. 74-82, vol. 277, Issue 1-3, Malaysia.
Korean Office Action issued by the Korean Patent Office dated Mar. 30, 2017 in connection with Korean Patent Application No. 10-2016-0117375.

* cited by examiner

*Primary Examiner* — G Steven Vanni
(74) *Attorney, Agent, or Firm* — Harvest IP Law LLP

(57) ABSTRACT

An apparatus and method for determining an amount of chemical input, and more particularly to an apparatus and method for determining the amount of a chemical to be added, which is necessary to achieve target water quality, wherein a required chemical concentration can be accurately calculated based on the temperature of the water and the target turbidity of the water includes an information-receiving unit configured to receive at least one of environmental information, chemical information, and water-quality information of the water present in a specific area and a chemical input determination unit configured to derive a multiple regression equation based on the received environmental information, chemical information, and water-quality information and to determine the future input of a chemical that is added to satisfy a target turbidity of the water present in the specific area based on the multiple regression equation.

8 Claims, 3 Drawing Sheets

APPARATUS AND METHOD FOR DETERMINING CHEMICAL INPUT

CROSS-REFERENCE TO RELATED APPLICATION

This application claims the benefit of Korean Patent Application No. 10-2016-0117375, filed Sep. 12, 2016, which is hereby incorporated by reference in its entirety.

BACKGROUND

The present disclosure relates to an apparatus and method for determining an amount of chemical input, and more particularly to an apparatus and method for determining the amount of a chemical to be added, which is necessary in order to achieve a target water quality.

In a DAF (Dissolved Air Flotation) process of a seawater desalination plant, a chemical is added so that colloidal material contained in the water is removed. In a conventional DAF process, the amount of the chemical that is added to obtain the target water quality is determined based on the experience of the processing operators. As the amount of the chemical to be added is determined based on the experience and know-how of the processing operators, it is difficult to determine the optimal chemical input depending on changes in environmental conditions of the seawater desalination plant.

In conventional cases, chemicals which are added into water may be used in amounts greater or less than the necessary chemical amounts. Hence, there is a need to accurately calculate a required chemical concentration based on the temperature of the water and the target turbidity thereof.

SUMMARY

Accordingly, an objective of the present disclosure is to provide an apparatus and method for determining an amount of chemical input in which a required chemical concentration may be accurately calculated based on the temperature of the water and the target turbidity of the water.

Another objective of the present disclosure is to provide an apparatus and method for determining an amount of chemical input in which required concentrations of two different chemicals may be accurately calculated based on the temperature of the water and the target turbidity of the water.

Still another objective of the present disclosure is to provide an apparatus and method for determining an amount of chemical input in which a multiple regression equation may be derived from a difference between future water turbidity and current water turbidity.

The objectives of the present disclosure are not limited to the foregoing, and a variety of other objectives may be incorporated within a range that is apparent to those skilled in the art through the following description.

Therefore, in an exemplary embodiment, an apparatus for determining an amount of chemical input comprises an information-receiving unit configured to receive at least one of environmental information, chemical information, and water-quality information of the water present in a specific area, and a chemical input determination unit configured to derive a multiple regression equation based on the received environmental information, chemical information, and water-quality information and to determine a future amount of chemical input to satisfy target turbidity of the water present in the specific area based on the multiple regression equation.

In an aspect thereof, the environmental information may be the current temperature of the water present in the specific area.

In another aspect thereof, the chemical information may include a current amount of input of a first chemical and a current amount of input of a second chemical, the first chemical and the second chemical being different from each other.

In still another aspect thereof, the water-quality information may be the current turbidity of the water present in the specific area.

In yet another aspect thereof, the chemical input determination unit may be configured to derive a relation between a future water turbidity, which represents a future turbidity of the water present in the specific area, and the future amount of chemical input based on the multiple regression equation.

In still yet another aspect thereof, the chemical input determination unit may be configured to calculate the future input of the chemical based on a significance level and the future water turbidity.

In another exemplary embodiment, a method of determining an amount of chemical input comprises the steps of receiving at least one of environmental information, chemical information, and water-quality information of the water present in a specific area, deriving a multiple regression equation based on the received environmental information, chemical information, and water-quality information, and determining the future input amount of a chemical that is to be added to satisfy target turbidity of the water present in the specific area based on the multiple regression equation.

In an aspect thereof, the environmental information may be the current temperature of the water present in the specific area.

In another aspect thereof, the chemical information may include a current amount of input of a first chemical and a current amount of input of a second chemical, the first chemical and the second chemical being different from each other.

In still another aspect thereof, the water-quality information may be the current turbidity of the water present in the specific area.

In yet another aspect thereof, the method of determining an amount of chemical input may include deriving a relation between a future water turbidity, which is the future turbidity of the water present in the specific area, and the future amount of chemical input based on the multiple regression equation.

In still yet another aspect thereof, the method of determining an amount of chemical input may include calculating the future input of the chemical based on a significance level and the future water turbidity.

In a further aspect thereof, the first chemical may be iron chloride and the second chemical may be sulfuric acid.

In still a further aspect thereof, the environmental information may be the current temperature of the water present in the specific area, the water-quality information may be the current turbidity of the water present in the specific area, and the multiple regression equation may be represented by Equation 1 below.

In still yet a further aspect thereof, the chemical input determination unit may be configured to calculate C0 to C4 of Equation 1 through an ordinary least-squares method.

In even still yet a further aspect thereof, the chemical input determination unit may be configured to derive Equation 6 below based on Equation 1 and Equation 4 below.

According to the present disclosure, a required chemical concentration can be accurately calculated based on the temperature of the water and the target turbidity of the water. Further, required concentrations of two different chemicals can be accurately calculated based on the temperature of the water and the target turbidity of the water. Still further, a multiple regression equation can be derived from a difference between future water turbidity and current water turbidity.

The effects of the present disclosure are not limited to the foregoing, and should be understood to incorporate all effects that can be reasonably inferred from the following description.

DETAILED DESCRIPTION

Figure 1:
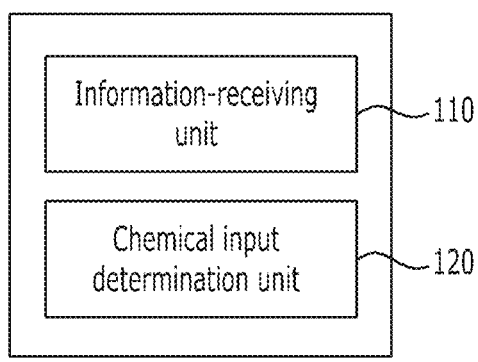
FIG. 1 is a block diagram of the overall configuration of an apparatus for determining an amount of chemical input according to an exemplary embodiment.

The foregoing and further aspects are embodied through the exemplary embodiments described with reference to the accompanying drawings. It is to be understood that the components of individual embodiments are provided in various combinations in the exemplary embodiments, unless otherwise mentioned or so long as they are not contradictory to each other. Furthermore, the present disclosure may be implemented in various different forms and is not limited to the embodiments described herein.

Throughout the drawings, in order to clearly illustrate the present disclosure, parts not related to the description are omitted, and the same or like parts are denoted by the same reference numerals throughout the specification. It is also to be understood that when any part is referred to as "comprising" or "including" any element, it does not exclude but may further include other elements unless otherwise stated.

It should also be understood that throughout the specification, when any part is referred to as being "connected" to another part, it may indicate not only being "directly connected" but also being "electrically connected", with a further element being interposed therebetween. Further, in the specification, a signal means a quantity of electricity, such as a voltage or a current.

As used herein, the term "unit" refers to a "block configured to change or add a plug-in to a hardware system or a software system," that is, a single component or block that performs a specific function in hardware or software.

FIG. 1 is a block diagram of the overall configuration of an apparatus for determining an amount of chemical input according to an exemplary embodiment of the present disclosure. In the exemplary embodiment, the apparatus for determining an amount of chemical input includes an information-receiving unit 110 and a chemical input determination unit 120.

In the exemplary embodiment, the information-receiving unit 110 is configured to receive at least one of environmental information, chemical information, and water-quality information of the water present in a specific area. The water present in a specific area is water contained in any one facility of a seawater desalination plant. The seawater desalination plant includes, for example, a Water RO Plant using reverse osmosis.

The seawater desalination plant includes a facility that performs an intake process. The intake process is a process of bringing seawater to the seawater desalination plant and functions to remove suspended materials from the seawater. The seawater from which suspended materials are removed is transferred to a facility that is responsible for DAF (Dissolved Air Flotation) using a pump.

The DAF process functions such that a colloidal material is separated from the seawater through a bubbling effect using a chemical and is then transferred to a subsequent processing unit. The colloidal material is composed of particles generally having a size of 0.001 to 0.1 μm. The colloidal material refers to various impurities contained in the seawater, and examples thereof may include microorganisms, ammonia, oil, etc.

Examples of the chemical for separating the colloidal material include iron chloride ($FeCl_3$) and sulfuric acid ($H_2SO_4$). Here, iron chloride is a coagulant for coagulating particles of the colloidal material to form large lumps, and sulfuric acid plays a role in maintaining the seawater at a pH of about 6.4 to about 7.0 in order to strengthen the coagulation effect.

The environmental information of the water present in a specific area may be the temperature of the water contained in the facility responsible for the DAF process. The chemical information may be the concentration of a chemical that is added to the water contained in the facility responsible for the DAF process. The concentration of the chemical is represented as PPM (parts per million). Specifically, the chemical information includes the concentrations of iron chloride and sulfuric acid.

The water-quality information may be turbidity of the water contained in the facility responsible for the DAF process. Here, the turbidity is an index that indicates the extent of cloudiness of the water, is analyzed by measuring the light interference of fine suspended particles by passing light through the sample, and is represented in NTUs (Nephelometric Turbidity Units).

The environmental information, the chemical information, and the water-quality information of the water present in a specific area are measured or calculated by means of a sensor and a computing device provided to the seawater desalination plant. The apparatus for determining the chemical input receives the measured or calculated environmental information, chemical information, and water-quality information.

In an exemplary embodiment, the chemical input determination unit 120 is configured to derive a multiple regression equation based on the received environmental information, chemical information, and water-quality information and to determine the future amount of chemical input. This is the amount of a chemical that is to be added to satisfy the target turbidity of the water present in the specific area, based on the multiple regression equation.

Autocorrelation means that a residual has a correlation. Some of the methods for estimating the autocorrelation include Visual Assessment, a Durbin-Watson Test, and a Breusch-Godfrey test.

When a multivariate regression model equation having p independent variables, $y_t=\beta_0+\Sigma_{i=1}^p \beta_i x_t+e_t$, t=1, . . . , n, is given, the Durbin-Watson statistic d for testing autocorrelation is defined as:

$$d = \frac{\sum_{t=2}^{n}(e_t - e_{t-1})^2}{\sum_{t=1}^{n} e_t^2},$$

where the statistic d has a value ranging from 0 to 4, and typically indicates no autocorrelation when close to 2, positive autocorrelation when close to 0, and negative autocorrelation when close to 4.

When comparing p-values relative to the statistic d at a predetermined significance level α=0.01, whether or not the residual has autocorrelation may be estimated. For example, if the p-value relative to the statistic d is less than 0.01, the residual $e_t$ is regarded as having autocorrelation.

In the case where autocorrelation is present, when a sufficient number of observations n are present to enable use of the Durbin-Watson statistic, it is known to satisfy the following approximation. Here, d=2×(1−ρ), that is, ρ=1−d/2.

Here, ρ is the autocorrelation coefficient of the first autocorrelation model AR(1) for a residual, and the residual, the autocorrelation of which is confirmed to be present through Durbin-Watson testing, is described as follows:

$e_t = \rho \cdot e_{t-1} + \epsilon_t$ where $|\rho|<1$.

In this case, problems may be solved by establishing a modified regression model with a first-order difference of two adjacent time points through the Cochrane-Orcutt procedure, which will be described later.

In the multiple regression equation of two adjacent time points $$y_t=\beta_0+\Sigma_{i=1}^p \beta_i x_t+e_t \quad (1)$$

and $$y_{t-1}=\beta_0+\Sigma_{i=1}^p \beta_i x_{t-1}+e_{t-1}, \quad (2)$$

the autocorrelation coefficient ρ is multiplied by both sides of equation (2), and then equations (1) and (2) are subjected to a difference operation, whereby the following is obtained:

$$y_t - \rho y_{t-1} = (1-\rho)\beta_0 + \Sigma_{i=1}^p \beta_i(x_t - \rho x_{t-1}) + e_t - \rho e_{t-1}.$$

Here, the approximate estimate for ρ may be determined from the Durbin-Watson statistic d, and the regression model for $y_t - \rho y_{t-1}$ is established, thereby obtaining an autocorrelation-free model.

$$\Delta \text{Turb}(t) = B0 + B1*\text{Turb}(t) + B2*F(t) + B3*S(t)*\text{Tmp}(t) + B4*S(t)*\text{Turb}(t) + e(t) \qquad \text{Equation 0}$$

In Equation 0, upon estimation of the turbidity change ΔTurb(t) for the chemical in the DAF process, the residual e(t) has autocorrelation. In this case, the predicted results are unreliable. The autocorrelation of the residual may be checked through Durbin-Watson testing.

As such, using the autocorrelation coefficient ρ=1−d/2 apparently derived from the Durbin-Watson statistic d and through the Cochrane-Orcutt procedure, the modified regression model having no autocorrelation may be obtained, and is represented by Equation 1 below.

$$\Delta Turb(t) - \rho \Delta Turb(t-1) = C0 + \qquad \text{Equation 1}$$
$$C1 * [Turb(t) - \rho * Turb(t-1)] + C2 * [F(t) - \rho * F(t-1)] +$$
$$C3 * [S(t) * Tmp(t) - \rho * S(t-1) * Tmp(t-1)] +$$
$$C4 * [S(t) * Turb(t) - \rho * S(t-1) * Turb(t)] + \epsilon(t)$$
$$\epsilon(t) = e(t) - \rho * e(t-1), \epsilon(t) \sim N(0, \sigma^2)$$

The chemical input determination unit 120 is configured to derive a multiple regression equation regarding the environmental information, chemical information, and water-quality information, as represented by Equation 1. The chemical input determination unit 120 is configured to derive a relation between the turbidity of the water present in a specific area, the concentration of a chemical, and the temperature. Turb indicates the turbidity of the water, F is the concentration of iron chloride, S is the concentration of sulfuric acid, and Tmp is the temperature of the water. Also, t is the future time point, t−1 is the current time point, and Δ indicates the change. The regression coefficients C0 to C4 and σ^2 are calculated through an ordinary least-squares method, where ρ is the autocorrelation coefficient ranging from −1 to 1.

$$\Delta Turb(t) - 0.6747 * \Delta Turb(t-1) = \qquad \text{Equation 3}$$
$$-0.3598 + 0.7316 * [Turb(t) -$$
$$0.6747 * Turb(t-1) + 0.06409 * [F(t) - 0.6747 * F(t-1)] -$$
$$0.0003628 * [S(t) * Tmp(t) - 0.6747 * S(t-1) * Tmp(t-1)] +$$
$$0.00201 * [S(t) * Turb(t) - 0.6747 * S(t-1) * Turb(t-1)]$$

The chemical input determination unit 120 is configured to calculate C0 to C4 of Equation 1 through the ordinary least-squares method. The results of calculation of C0 to C4 of Equation 1 are represented by Equation 3, the autocorrelation coefficient of which is 0.6747.

$$\text{Turb}(t)=\text{Turb}(t-1)+\Delta\text{Turb}(t-1) \qquad \text{Equation 4}$$

The water turbidity at the future time point Turb(t) is represented by Equation 4.

$$Turb(t) = Turb(t-1) + \qquad \text{Equation 5}$$
$$0.6747 * \Delta Turb(t-1) - 0.3598 + 0.7316 * [Turb(t) -$$
$$0.6747 * Turb(t-1) + 0.06409 * [F(t) - 0.6747 * F(t-1)] -$$
$$0.003628 * [S(t) * Tmp(t) - 0.6747 * S(t-1) * Tmp(t-1)] +$$
$$0.00201 * [S(t) * Turb(t) - 0.6747 * S(t-1) * Turb(t-1)]$$

The chemical input determination unit 120 is configured to derive Equation 5 based on Equations 3 and 4. The target turbidity Turb(t) of the water present in a specific area is the future water turbidity. Turb(t−1), F(t−1), S(t−1) and Tmp(t−1) are numeric constants for the current time point, received from the information-receiving unit 110.

$$Turb(t+1) = Turb(t) - \Big\{ \rho * \Delta Turb(t-1) + \qquad \text{Equation 6}$$
$$g_1(F(t), S(t)) - t_{1-\alpha, n-4}\sqrt{\hat{\sigma}^2 + [g_2(F(t), S(t))]} \Big\}$$

The chemical input determination unit 120 is configured to derive Equation 6 based on Equations 1 and 4. Turb(t) is the target water turbidity, for example, 2.5 NTUs. Also, $\alpha$ is the significance level less than 1 but exceeding 0. Also, $g_1(F(t),S(t))$ is the expected value of $\Delta Turb(t)-\rho \Delta Turb(t-1)$ in $(F(t),S(t))$, and is as follows:

$$g_1(F(t), S(t)) = C0 + C1 * [Turb(t) - \rho * Turb(t-1)] +$$
$$C2 * [F(t) - \rho * F(t-1)] + C3 * [S(t) * Tmp(t) - \rho * S(t-1) * Tmp(t-1)] +$$
$$C4 * [S(t) * Turb(t) - \rho * S(t) * Turb(t)].$$

$\hat{\sigma}_2$ is the dispersion of a predicted model residual calculated through the ordinary least-squares method based on Equation 1. $t_{1-\alpha,n-4}$ is the $(1-\alpha)\times 100\%$ fractile of t-distribution in which the degree of freedom is (n−4). Also, $g_2(F(t), S(t))$ is the standard deviation of $\Delta Turb(t)-\rho \Delta Turb(t-1)$ in $(F(t),S(t))$.

When the water turbidity information $Turb(t)$ observed at the time point t is given, the expected value of $\Delta Turb(t)$ may be determined by adding $g_1(F(t),S(t))$, which is the expected value of Equation 1 $[\Delta Turb(t)-\rho \Delta Turb(t-1)]$, with $\rho \Delta Turb(t-1)$.

As such, in the expected value of $\Delta Turb(t)$, a $(1-\alpha)\times 100\%$ one-sided prediction interval is applied to thus add the margin $-t_{1-\alpha,n-4}\sqrt{\hat{\sigma}^2+[g_2(F(T),S(t))]}$.

Equation 6 may be defined as the following function:

$$f(F(t),S(t))=Turb(t+1)=Turb(t)-\{\rho^*\Delta Turb(t-1)+g_1(F(t),S(t))-t_{1-\alpha,n-4}\sqrt{\hat{\sigma}^2 g_2(F(t),S(t))]}\}$$

When the water turbidity, which is the target water quality at the future time point (t+1) is, for example 2.5, in order to determine the chemical input $F(t),S(t)$ at the current time point (t) therefor, combinations of $(F(t),S(t))$ satisfying $f(F(t),S(t))=2.5$ under restriction conditions $F_L \leq F(t) \leq F_U$ and $S_L \leq S(t) \leq S_U$ are searched thus obtaining a series of sets, and the set of combinations of $(F(t),S(t))$ is the optimal chemical input that satisfies the confidence level $(1-\alpha)\times 100\%$, considering the prediction error.

The chemical input determination unit 120 is configured to determine the chemical input range to achieve the target water turbidity of 2.5 NTUs based on Equation 6. The amount of chemical input may be determined from the chemical input range thus obtained. The chemical includes a first chemical and a second chemical, and the amount of each of the first chemical and the second chemical may be determined. The chemical input range is described later with reference to FIG. 2.

In an exemplary embodiment, the environmental information is characterized in that it is the current temperature of the water present in a specific area. The water present in the specific area is water contained in a facility in which the DAF process is performed. The water turbidity may vary depending not only on the amount of the chemical that is added to water but also on the temperature.

In an exemplary embodiment, the chemical information includes the current input amount of each of two different chemicals, for example, a first chemical and a second chemical, the first chemical being iron chloride and the second chemical being sulfuric acid. Here, iron chloride is a coagulant for coagulating particles of the colloidal material to form large lumps, and sulfuric acid plays a role in maintaining the seawater at a pH of about 6.4 to about 7.0 in order to strengthen the coagulation effect.

In an exemplary embodiment, the water-quality information is the current turbidity of the water present in a specific area. Here, the turbidity is an index that indicates the extent of cloudiness of the water, is analyzed by measuring the light interference of fine suspended particles by passing light through the sample, and is represented in NTUs (Nephelometric Turbidity Units).

In an exemplary embodiment, the chemical input determination unit 120 is characterized in that a relation between the future water turbidity, which is the future turbidity of the water present in a specific area, and the future amount of chemical input is derived based on the multiple regression equation. The future water turbidity is the target turbidity of the water. The relational expression for the future water turbidity, which is the future turbidity of the water present in a specific area, and the future amount of chemical input may be Equation 6 as mentioned above.

In an exemplary embodiment, the chemical input determination unit 120 is characterized in that the future amount of chemical input is calculated based on the significance level and the future water turbidity. The chemical input determination unit 120 functions to set the significance level and the future water turbidity, which is the target turbidity of the water. The target turbidity of the water may be, for example, 2.5 NTUs, and the significance level is a numeric value less than 1 but exceeding 0. The chemical input determination unit 120 is able to determine the chemical input range in order to achieve the target turbidity of the water based on Equation 6. Here, the chemical input range is the future amount of chemical input range.

Figure 2:
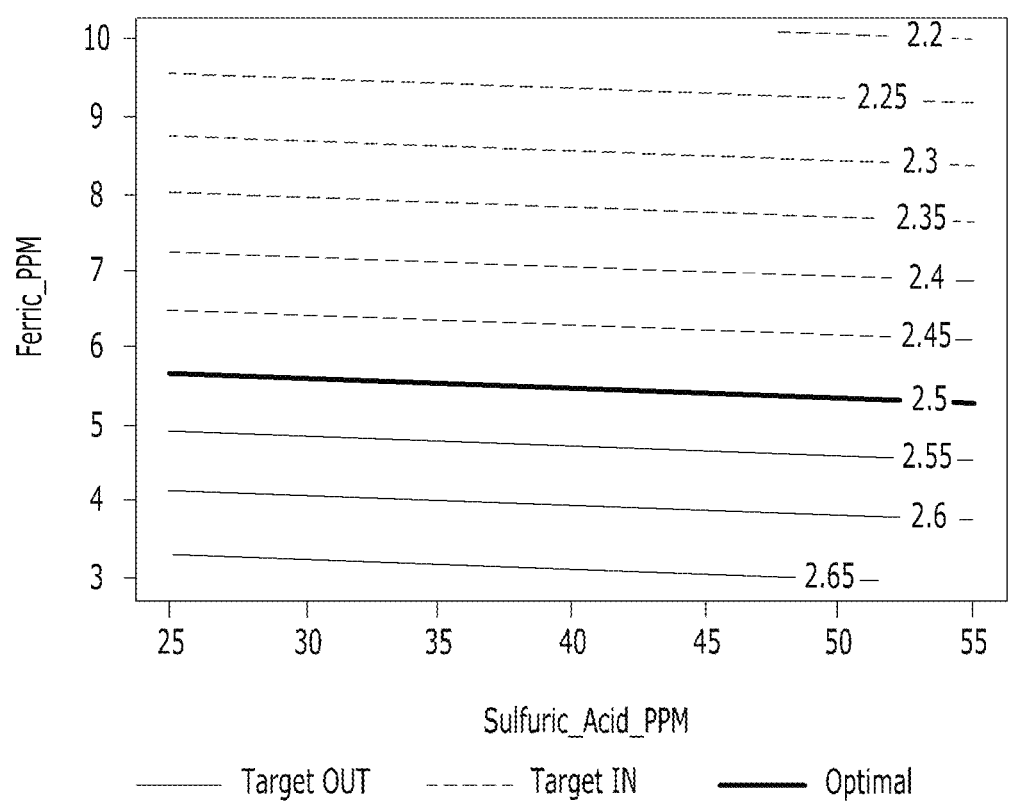
FIG. 2 is a graph showing the chemical input range in order to achieve the target water turbidity in consideration of the significant level.

FIG. 2 is a graph showing the chemical input range to achieve the target turbidity of the water considering the significance level. Specifically, FIG. 2 illustrates the chemical input range to achieve the target turbidity of the water when the significance level is set to 0.9. In order to realize the target water turbidity, for example, 5.5 ppm or more of iron chloride is required. As shown, regardless of the amount of sulfuric acid, iron chloride has to be used in an amount of 5.5 ppm or more to achieve the target turbidity of the water.

Figure 3:
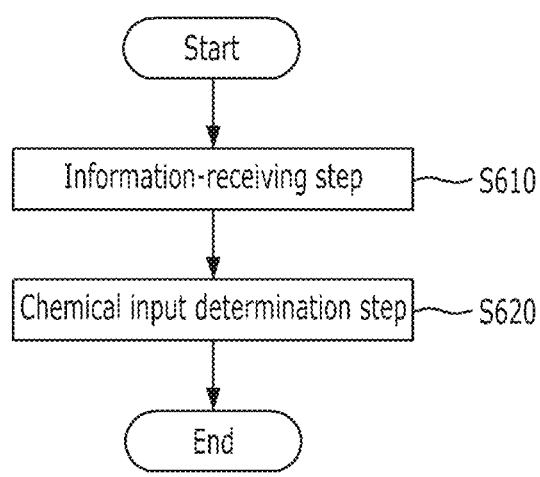
FIG. 3 is a flowchart showing a process of determining an amount of chemical input according to an exemplary embodiment.

FIG. 3 is a flowchart showing the process of determining the chemical input according to an exemplary embodiment of the present disclosure.

In the exemplary embodiment, a method of determining the chemical input includes an information-receiving step (S610) and a chemical input determination step (S620).

In the exemplary embodiment, the information-receiving step (S610) receives at least one of environmental information, chemical information, and water-quality information of the water present in a specific area. The water present in a specific area is water contained in any one facility of the seawater desalination plant. The seawater desalination plant includes, for example, a Water RO Plant using reverse osmosis.

The seawater desalination plant includes a facility that performs an intake process. The intake process is a process of bringing seawater to the seawater desalination plant and additionally functions to remove suspended materials from the seawater. The seawater from which suspended materials are removed is transferred to the facility that is responsible for DAF (Dissolved Air Flotation) using a pump.

The DAF process functions such that a colloidal material is separated from the seawater through a bubbling effect using a chemical and is then transferred to the subsequent processing unit. The colloidal material is composed of particles generally having a size of 0.001 to 0.1 µm. The colloidal material refers to various impurities contained in the seawater, and examples thereof may include microorganisms, ammonia, oil, etc.

Examples of the chemical for separating the colloidal material include iron chloride ($FeCl_3$) and sulfuric acid ($H_2SO_4$). Here, iron chloride is a coagulant for coagulating particles of the colloidal material to form large lumps, and sulfuric acid plays a role in maintaining the seawater at a pH of about 6.4 to about 7.0 in order to strengthen the coagulation effect.

The environmental information of the water present in a specific area may be the temperature of the water contained in the facility responsible for the DAF process. The chemical information may be the concentration of a chemical that is added to the water contained in the facility responsible for the DAF process. The concentration of the chemical is represented as PPM (parts per million). Specifically, the chemical information includes the concentrations of iron chloride and sulfuric acid.

The water-quality information may be turbidity of the water contained in the facility responsible for the DAF process. Here, the turbidity is an index that indicates the extent of cloudiness of the water, is analyzed by measuring the light interference of fine suspended particles by passing light through the sample, and is represented in NTUs (Nephelometric Turbidity Units).

The environmental information, the chemical information, and the water-quality information of the water present in the specific area are measured or calculated by means of a sensor and a computing device provided to the seawater desalination plant. The method of determining the chemical input includes receiving the measured or calculated environmental information, chemical information, and water-quality information.

In an exemplary embodiment, the chemical input determination step (S620) includes deriving a multiple regression equation based on the received environmental information, chemical information, and water-quality information and determining the future amount of chemical input. This is the amount of a chemical that is to be added to satisfy the target turbidity of the water present in the specific area, based on the multiple regression equation.

Autocorrelation means that a residual has a correlation. Some of the methods for estimating the autocorrelation include Visual Assessment, a Durbin-Watson Test, and a Breusch-Godfrey test.

When a multivariate regression model equation having p independent variables, $y_t=\beta_0+\Sigma_{i=1}^p \beta_i x_t+e_t$, $t=1, \ldots, n$, is given, the Durbin-Watson statistic d for testing autocorrelation is as defined as:

$$d = \frac{\sum_{t=2}^{n}(e_t - e_{t-1})^2}{\sum_{t=1}^{n} e_t^2},$$

where the statistic d has a value ranging from 0 to 4, and typically indicates no autocorrelation when close to 2, positive autocorrelation when close to 0, and negative autocorrelation when close to 4.

When comparing p-values relative to the statistic d at a predetermined significance level $\alpha=0.01$, whether or not the residual has autocorrelation may be estimated. For example, if the p-value relative to the statistic d is less than 0.01, the residual $e_t$ is regarded as having autocorrelation.

In the case where autocorrelation is present, when a sufficient number of observations n are present to enable use of the Durbin-Watson statistic, it is known to satisfy the following approximation. Here, $d=2\times(1-\rho)$, that is, $\rho=1-d/2$.

Here, $\rho$ is the autocorrelation coefficient of the first autocorrelation model AR(1) for a residual, and the residual, the autocorrelation of which is confirmed to be present through Durbin-Watson testing, is as follows:

$$e_t=\rho \cdot e_{t-1}+\epsilon_t \text{ where } |\rho|<1.$$

In this case, problems may be solved by establishing a modified regression model with a first-order difference of two adjacent time points through the Cochrane-Orcutt procedure, which will be described later.

In the multiple regression equation of two adjacent time points $$y_t=\beta_0+\Sigma_{i=1}^p \beta_i x_t+e_t \quad (1)$$

and $$y_{t-1}=\beta_0+\Sigma_{i=1}^p \beta_i x_{t-1}+e_{t-1} \quad (2),$$

the autocorrelation coefficient $\rho$ is multiplied by both sides of equation (2), and then equations (1) and (2) are subjected to a difference operation, whereby the following is obtained:

$$y_t-\rho y_{t-1}=(1-\rho)\beta_0+\Sigma_{i=1}^p \beta_i(x_t-\rho x_{t-1})+e_t-\rho e_{t-1}.$$

Here, the approximate estimate for $\rho$ may be determined from the Durbin-Watson statistic d, and the regression model for $y_t-\rho y_{t-1}$ is established, thereby obtaining an autocorrelation-free model.

In Equation 0 presented above, upon estimation of the turbidity change $\Delta\text{Turb}(t)$ for the chemical in the DAF process, the residual e(t) has autocorrelation. In this case, the predicted results are unreliable. The autocorrelation of the residual may be checked through Durbin-Watson testing.

As such, using the autocorrelation coefficient $\rho=1-d/2$ apparently derived from the Durbin-Watson statistic d and through the Cochrane-Orcutt procedure, the modified regression model having no autocorrelation may be obtained, and is represented by Equation 1 presented above. The chemical input determination step (S620) includes deriving a multiple regression equation regarding the environmental information, chemical information, and water-quality information, as represented by Equation 1 above. The chemical input determination step (S620) includes deriving a relation between the turbidity of the water present in a specific area, the concentration of a chemical and the temperature. Turb indicates the turbidity of the water, F is the concentration of iron chloride, S is the concentration of sulfuric acid, and Tmp is the temperature of the water. Also, t is the future time point, t−1 is the current time point, and A indicates the change.

The regression coefficients C0 to C4 and 6^2 are determined through an ordinary least-squares method, where the regression coefficients C0, C1 and C2, and the autocorrelation coefficient $\rho$ range from −1 to 1.

The chemical input determination step (S620) includes calculating C0 to C4 of Equation 1 through the ordinary least-squares method. The results of calculation of C0 to C4 of Equation 1 are represented by Equation 3 above, the autocorrelation coefficient of which is 0.6747. The water turbidity at a future time point is represented by Equation 4 above.

The chemical input determination step (S620) includes deriving Equation 5, presented above, based on Equations 3 and 4. The target turbidity Turb(t) of the water present in the specific area is the future water turbidity. Turb(t−1), F(t−1), S(t−1) and Tmp(t−1) are numeric constants for the current time point, received in the information-receiving step (S610).

The chemical input determination step (S620) includes deriving Equation 6, presented above, based on Equations 1 and 4. Turb(t) is the target water turbidity, for example, 2.5 NTUs. Also, $\alpha$ is the significance level less than 1 but exceeding 0.

Also, $g_1(F(t),S(t))$ is the expected value of $\Delta Turb(t)-\rho\Delta Turb(t-1)$ in $(F(t),S(t))$, and is as follows:

$$g_1(F(t), S(t)) = C0 + C1 * [Turb(t) - \rho * Turb(t-1)] +$$
$$C2 * [F(t) - \rho * F(t-1)] + C3 * [S(t) * Tmp(t) - \rho * S(t-1) * Tmp(t-1)] +$$
$$C4 * [S(t) * Turb(t) - \rho * S(t) * Turb(t)].$$

$\hat{\sigma}_2$ is the dispersion of a predicted model residual calculated through the ordinary least-squares method based on Equation 1 presented above. $t_{1-\alpha,n-4}$ is the $(1-\alpha)\times 100\%$ fractile of t-distribution in which the number of degrees of freedom is (n−4). Also, $g_2(F(t),S(t))$ is the standard deviation of $\Delta Turb(t)-\rho\Delta Turb(t-1)$ in $(F(t),S(t))$.

When the water turbidity information Turb(t) observed at the time point t is given, the expected value of $\Delta Turb(t)$ may be determined by adding $g_1(F(t),S(t))$, which is the expected value of Equation 1 $[\Delta Turb(t)-\rho\Delta Turb(t-1)]$, with $\rho\Delta Turb(t-1)$.

As such, in the expected value of $\Delta Turb(t)$, a $(1-\alpha)\times 100\%$ one-sided prediction interval is applied to thus add the margin $-t_{1-\alpha,n-4}\sqrt{\hat{\sigma}^2+[g_2(F(T),S(t)]}$.

As defined in Equation 6 presented above, when the water turbidity, which is the target water quality at the future time point (t+1) is, for example 2.5, in order to determine the chemical input F(t),S(t) at the current time point (t) therefor, combinations of (F(t),S(t)) satisfying f(F(t),S(t))=2.5 under restriction conditions $F_L \leq F(t) \leq F_U$ and $S_L \leq S(t) \leq S_U$ are searched thus obtaining a series of sets thereof, and the set of combinations of (F(t),S(t)) is the optimal chemical input that satisfies the confidence level $(1-\alpha)\times 100\%$ considering the prediction error.

The chemical input determination step (S620) includes determining the chemical input range in order to achieve the target water turbidity of 2.5 NTUs based on Equation 6 presented above. The amount of chemical input may be determined from the chemical input range thus obtained. The chemical includes a first chemical and a second chemical, and the amount of each of the first chemical and the second chemical may be determined. The chemical input range is as described with reference to FIG. 2.

In an exemplary embodiment, the environmental information is characterized in that it is the current temperature of the water present in a specific area. The water present in the specific area is water contained in a facility in which the DAF process is performed. The water turbidity may vary depending not only on the amount of a chemical that is added to water but also on the temperature.

In an exemplary embodiment, the chemical information includes the current input amount of each of two different chemicals, for example, a first chemical and a second chemical. The chemical input determination unit determines the future amount of chemical input in order to satisfy the target turbidity of the water taking into consideration the current input of the first chemical and the current input of the second chemical, the first chemical being iron chloride and the second chemical being sulfuric acid. Here, iron chloride is a coagulant for coagulating particles of the colloidal material to form large lumps, and sulfuric acid plays a role in maintaining the seawater at a pH of about 6.4 to about 7.0 in order to strengthen the coagulation effect.

In an exemplary embodiment, the water-quality information is characterized in that it is the current turbidity of the water present in a specific area. The chemical input determination unit determines the future amount of chemical input in order to satisfy the target turbidity of the water taking into consideration the current turbidity of the water. Here, the turbidity is an index that indicates the extent of cloudiness of the water, is analyzed by measuring the light interference of fine suspended particles by passing light through the sample, and is represented in NTUs (Nephelometric Turbidity Units).

In an exemplary embodiment, the chemical input determination step (S620) is characterized in that a relation between the future water turbidity, which is the future turbidity of the water present in a specific area, and the future amount of chemical input is derived based on the multiple regression equation. The future water turbidity is the target water turbidity. The relational expression for the future water turbidity, which is the future turbidity of the water present in a specific area, and the future amount of chemical input may be Equation 6 as described above.

In an exemplary embodiment, the chemical input determination step (S620) is characterized in that the future amount of chemical input is calculated based on the significance level and the future water turbidity. The chemical input determination unit step (S620) includes setting the significance level and the future water turbidity, which is the target turbidity of the water. The target turbidity of the water may be, for example, 2.5 NTUs, and the significance level is a numeric value less than 1 but exceeding 0. The chemical input determination step (S620) is able to calculate the chemical input range to achieve the target turbidity of the water based on Equation 6 presented above. Here, the chemical input range is the future amount of chemical input range.

As described hereinbefore, those skilled in the art will be able to recognize that the present disclosure may be embodied in other specific forms without departing from the technical spirit or essential features thereof. It is therefore to be understood that the aforementioned embodiments are merely illustrative and not restrictive of the scope of the disclosure. It is also to be understood that the flowcharts shown in the drawings are sequential steps that are set forth merely in order to achieve the most desirable results in practicing the present disclosure, and that other additional steps may be provided, or some steps may be omitted.

The technical features and embodiments described herein may be implemented in digital electronic circuitry, or may be implemented in computer software, firmware, or hardware, including structures and structural equivalents thereof, as described herein, or combinations thereof. Also, embodiments for realizing the technical features described herein may be implemented as computer program products, that is, modules relating to computer program instructions encoded on a program storage medium of a type for execution by, or for controlling, the operation of the processing system.

The computer-readable medium can be a machine-readable storage device, a machine-readable storage substrate, a memory device, a composition of matter that affects the machine-readable propagation-type signal, or a combination thereof.

As used herein, the term "apparatus" or "system" includes all tools, instruments, and machines for processing data including, for example, a processor, a computer or a multiprocessor or a multicomputer. The processing system may include, in addition to the hardware, all the code that forms an execution environment for the computer program at the request of code that constitutes processor firmware, a protocol stack, a database management system, an operating system, or combinations thereof.

A computer program, also known as a program, software, software application, script or code, may be written in any form of programming language, including a compiled or interpreted language or a transcendental or procedural language, or may be implemented in any form including independent programs or modules, components, subroutines, or other units suitable for use in a computer environment.

Meanwhile, a computer program does not necessarily correspond to a file in the file system, but may be stored in a single file provided to the requested program or in multiple interactive files (e.g., files for storing one or more modules, subprograms, or portions of code), or a portion of a file that holds other programs or data (e.g., one or more scripts stored in a markup language document).

A computer program may be executed so as to run on multiple computers or on one or more computers located in a single site or distributed across a plurality of sites and interconnected by a wired/wireless communication network.

Meanwhile, computer-readable media suitable for storing computer program instructions and data include, for example, semiconductor memory devices such as EPROM, EEPROM and flash memory devices, for example, all types of non-volatile memory, media and memory devices, including magnetic disks such as internal hard disks or external disks, magneto-optical disks and CDs and DVD disks. The processor and memory may be supplemented by, or integrated with, logic circuits for use for special purposes.

Embodiments that implement the technical features described herein may be executed in an operating system, including, for example, back-end components such as a data server, middleware components such as an application server, front-end components such as a web browser or a client computer with a graphical user interface that allows a user to interact with an embodiment of the subject matter described herein, or combinations of such back-end, middleware or front-end components. The components of the system may also be interconnected by any form or medium of digital data communication, for example, a communication network.

The apparatus and method described herein may be partially or totally used through means for executing computer software, program code or instructions on one or more processors included in a server associated with a client device or a web-based storage system. Here, the processor may be part of a computing platform, such as a server, a client, a network infrastructure, a mobile computing platform, a fixed computing platform, etc., and may specifically be a type of computer or processing device capable of executing program instructions, code, etc. Furthermore, the processor may further include a memory for storing a method, an instruction, code, and a program. In the case where the memory is not included, the processor may access a storage device, such as a CD-ROM, DVD, memory, hard disks, flash drives, RAM, ROM, a cache, etc., in which the method, the instruction, the code and the program are stored, through an additional interface.

Also, the apparatus and method described herein may be partially or totally used through a device for executing computer software on a server, a client, gateway, hub, router or network hardware. Here, software may be executed by various kinds of servers, such as a file server, print server, domain server, Internet server, intranet server, host server, distributed server, etc., and these servers may further include a memory, a processor, a computer-readable storage medium, a storage medium, a communication device, a port, a client, and an interface accessible to other servers via a wired/wireless network.

Also, the method, the instruction, the code and the like may be executed by servers, and other devices for executing the method may be implemented as part of the hierarchical structure associated with the server.

Moreover, the server is able to provide an interface to another device including a client, another server, a printer, a database server, a print server, a file server, a communication server, a distributed server, etc. without limitation thereto, and the connection through the interface may facilitate the remote execution of the program via the wired/wireless network.

Also, any of the devices connected to the server via the interface may further include at least one storage device capable of storing methods, instructions, code and the like for issuing face-to-face OTP applications, and the central processor of the server may provide instructions, code, etc. to be executed on different devices to the device so as to realize storage on the storage device.

Meanwhile, the apparatus and method described herein may be partially or totally used via network infrastructures. The network infrastructures may include all of a device such as a computing device, a server, a router, a hub, a firewall, a client, a personal computer, a communication device, a routing device, etc., and a separate module, and may further include a storage medium, such as a story flash memory, a buffer, a stack, RAM, ROM or the like, in addition to the device and the separate module. Furthermore, the method, the instruction, the code and the like may be executed and stored by any one among devices, modules and storage media of the network infrastructures, and other devices necessary for performing the method may be implemented as part of the network infrastructure.

Also, the apparatus and method described herein may be implemented in hardware or a combination of software and hardware suitable for specific applications. The hardware may include a general-purpose computer device such as a personal computer, a mobile communication terminal, etc., and a specific computer device suitable for an enterprise, and the computer device may be implemented by devices including memory, a microprocessor, a microcontroller, a digital signal processor, an application-specific integrated circuit, a programmable gate array, a programmable array structure, or combinations thereof.

The computer software, instruction, code, etc., as described above may be stored or accessed by a readable device, and the readable device may include computer components having digital data used for computing over a period of time, semiconductor storage such as RAM or ROM, permanent storage such as an optical disk, mass storage such as a hard disk, tape, or drum, optical storage such as a CD or DVD, flash memory, floppy disks, magnetic tape, paper tape, independent RAM disks, mass storage removable from a computer, and network-attached storage such as dynamic memory, static memory, variable storage and the cloud. Here, the instructions and code may include all of data-oriented languages such as SQL and dBase, system languages such as C, Objective C, C++, and assembly, architectural languages such as Java and NET, and application languages such as PHP, Ruby, Perl, and Python, but the present disclosure is not limited thereto, and all languages widely known to those skilled in the art may be incorporated.

As used herein, the term "computer-readable medium" includes all media that contribute to providing instructions to the processor for program execution. Specific examples thereof may include, but are not limited to, non-volatile media such as data storage devices, optical disks, magnetic disks, etc., volatile media such as dynamic memory, and transmission media such as coaxial cables, copper wires, optical fibers and the like that transmit data.

Meanwhile, configurations implementing the technical features of the present disclosure, which are included in the block diagrams and flowcharts shown in the drawings attached hereto, refer to the logical boundaries between the configurations.

However, according to embodiments of software and hardware, depicted arrangements and their functions may be implemented in the form of a stand-alone software module, a monolithic software structure, code, a service, and a combination thereof, and are stored in a medium executable on a computer having a processor capable of executing storage program code, instructions and the like to thus realize the functions thereof, and all such embodiments are also considered to fall within the scope of the present disclosure.

The accompanying drawings and the description related thereto are thus not to be construed as merely explaining the technical features of the present disclosure, and should not be merely inferred, unless a specific arrangement of software for implementing such technical features is explicitly mentioned. That is, it should be understood that various embodiments described above may exist, and such embodiments may be partially modified while retaining the same technical characteristics as those of the present disclosure, and thus they also fall within the scope of the present disclosure.

Moreover, while the flowcharts depict operations in the drawings in a particular order, they are shown for the sake of obtaining the most desirable results, and it should be understood that such operations are not necessarily to be performed in the specific order shown or in a sequential order, or even that all illustrated operations must necessarily be performed. In certain cases, multitasking and parallel processing may become advantageous. Furthermore, the separation of various system components of the embodiments described above should not be understood as requiring such separation in all embodiments, and it should be understood that the program components and systems described may generally be integrated together into a single software product or packaged into multiple software products.

As such, the present specification is not intended to limit the disclosure by the specific terms presented. Although the present disclosure has been particularly shown and described with reference to exemplary embodiments thereof, it is evident that many alternatives, modifications, and variations will be apparent to those skilled in the art.

It will be understood by those skilled in the art that a variety of modifications and variations can be made in the present disclosure without departing from the spirit and scope of the disclosure as defined by the appended claims.

What is claimed is:

1. An apparatus for determining an amount of chemical to be added to water present in a specific area of a seawater desalination plant including an intake facility for bringing seawater into the seawater desalination plant, removing suspended materials from the seawater, and pumping the seawater from which suspended materials are removed to the specific area, the apparatus comprising:

at least one processor configured to:
receive information from at least one sensor arranged in the water of the specific area, the received information including a current temperature of the water present in the specific area, a parts per million (PPM) indication of current concentrations of each of iron chloride ($FeCl_3$) and sulfuric acid ($H_2SO_4$) contained in the water present in the specific area, and a current turbidity of the water present in the specific area, the current turbidity being measured in nephelometric turbidity units (NTU) and indicating an extent of cloudiness of the water, obtain a regression model to determine the added amount of chemical by the deriving a multiple regression equation based on the information received by the at least one sensor at each of two adjacent time points, set each of a significance level and a target turbidity of the water present in the specific area, the significance level having a numeric value less than 1 but exceeding 0, the target turbidity of the water present in the specific area being 2.5 NTUs, and determine a future amount of chemical input to satisfy the target turbidity of the water present in the specific area for a given value of the significance level, based on the multiple regression equation; and a dissolved air flotation (DAF) system to separate a colloidal material from the seawater brought in by the intake facility using the future amount of chemical input, wherein the multiple regression equation is represented by $$\Delta Turb(t) - \rho \Delta Turb(t-1) = C0 + C1 * [Turb(t) - \rho * Turb(t-1)] +$$
$$C2 * [F(t) - \rho * F(t-1)] + C3 * [S(t) * Tmp(t) - \rho * S(t-1) * Tmp(t-1)] +$$
$$C4 * [S(t) * Turb(t) - \rho * S(t) * Turb(t)] + \epsilon(t)$$

where $\epsilon(t) = e(t) - \rho \times e(t-1)$, $\epsilon(t) \sim N(0, \sigma^2)$; Turb is a turbidity of the water; F is a concentration of the iron chloride; S is a concentration of the sulfuric acid; Tmp is a temperature of the water; t represents a future time point of the two adjacent time points; t−1 is a current time point of the two adjacent time points; $\Delta$ is a change factor; $\rho$ is an autocorrelation coefficient; and C0 to C4 are regression coefficients calculated through an ordinary least-squares method.

2. The apparatus of claim 1, wherein the at least one processor is further configured to derive a relation between a future water turbidity, which represents a future turbidity of the water present in the specific area, and the future amount of chemical input based on the multiple regression equation.

3. The apparatus of claim 2, wherein the at least one processor is further configured to calculate the future amount of chemical input based on the significance level and the future water turbidity.

4. The apparatus of claim 1, wherein the future amount of chemical input includes a range of values achieving the target water turbidity according to $$Turb(t+1) =$$
$$Turb(t) - \left\{ \rho * \Delta Turb(t-1) + g_1(F(t), S(t)) - t_{1-\alpha, n-4} \sqrt{\hat{\sigma}^2 + [g_2(F(t), S(t))]} \right\}$$

where Turb(t) is the target water turbidity; $\alpha$ is the significance level; $g_1(F(t), S(t))$ is an expected value of $\Delta Turb(t) - \rho \Delta Turb(t-1)$ in (F(t), S(t)); $\hat{\sigma}^2$ is a dispersion of a predicted model residual calculated through the ordinary least-squares method; $t_{1-\alpha, n-4}$ is $(1-\alpha) \times 100\%$ fractile of t-distribution in which a degree of freedom is n−4; and $g_2(F(t), S(t))$ is a standard deviation of $\Delta Turb(t)-\rho\Delta Turb(t-1)$ in $(F(t), S(t))$.

5. A method of determining an amount of chemical to be added to water present in a specific area of a seawater desalination plant including an intake facility for bringing seawater into the seawater desalination plant, removing suspended materials from the seawater, and pumping the seawater from which suspended materials are removed to the specific area, the method comprising:

receiving information from at least one sensor arranged in the water of the specific area, the received information including a current temperature of the water present in the specific area, a parts per million (PPM) indication of current concentrations of each of iron chloride ($FeCl_3$) and sulfuric acid ($H_2SO_4$) contained in the water present in the specific area, and a current turbidity of the water present in the specific area, the current turbidity being measured in nephelometric turbidity units (NTU) and indicating an extent of cloudiness of the water;

obtaining a regression model to determine the added amount of chemical by deriving a multiple regression equation based on the information received by the at least one sensor at each of two adjacent time points;

setting each of a significance level and a target turbidity of the water present in the specific area, the significance level having a numeric value less than 1 but exceeding 0, the target turbidity of the water present in the specific area being 2.5 NTUs;

determining a future amount of chemical input to satisfy the target turbidity of the water present in the specific area for a given value of the significance level, based on the multiple regression equation; and separating a colloidal material from the seawater brought in by the intake facility using the future amount of chemical input, wherein the multiple regression equation is represented by $$\Delta Turb(t) - \rho\Delta Turb(t-1) = C0 + C1 * [Turb(t) - \rho * Turb(t-1)] +$$
$$C2 * [F(t) - \rho * F(t-1)] + C3 * [S(t) * Tmp(t) - \rho * S(t-1) * Tmp(t-1)] +$$
$$C4 * [S(t) * Turb(t) - \rho * S(t) * Turb(t)] + \epsilon(t)$$

where $\epsilon(t)=e(t)-\rho \times e(t-1)$, $\epsilon(t) \sim N(0, \sigma^2)$; Turb is a turbidity of the water; F is a concentration of the iron chloride; S is a concentration of the sulfuric acid; Tmp is a temperature of the water; t represents a future time point of the two adjacent time points; t−1 is a current time point of the two adjacent time points; $\Delta$ is a change factor; $\rho$ is an autocorrelation coefficient; and C0 to C4 are regression coefficients calculated through an ordinary least-squares method.

6. The method of claim 5, wherein the determining the chemical input further includes deriving a relation between a future water turbidity, which represents a future turbidity of the water present in the specific area, and the future amount of chemical input based on the multiple regression equation.

7. The method of claim 6, wherein the determining the chemical input further includes calculating the future amount of chemical input based on the significance level and the future water turbidity.

8. The method of claim 5, wherein the future amount of chemical input includes a range of values achieving the target water turbidity according to $$Turb(t+1) =$$
$$Turb(t) - \left\{ \rho * \Delta Turb(t-1) + g_1(F(t), S(t)) - t_{1-\alpha,n-4}\sqrt{\hat{\sigma}^2 + [g_2(F(t), S(t))]} \right\}$$

where Turb(t) is the target water turbidity; $\alpha$ is the significance level; $g^1(F(t), S(t))$ is an expected value of $\Delta Turb(t)-\rho\Delta Turb(t-1)$ in $(F(t), S(t))$; $\hat{\sigma}^2$ is a dispersion of a predicted model residual calculated through the ordinary least-squares method; $t_{1-\alpha, n-4}$ is $(1-\alpha)\times 100\%$ fractile of t-distribution in which a degree of freedom is n−4; and $g_2(F(t), S(t))$ is a standard deviation of $\Delta Turb(t)-\rho\Delta Turb(t-1)$ in $(F(t), S(t))$.

* * * * *